US006821024B2

(12) United States Patent  
Bates, III

(10) Patent No.: US 6,821,024 B2
(45) Date of Patent: Nov. 23, 2004

(54) CONNECTOR SECONDARY LATCH

(75) Inventor: Charles Linsday Bates, III, Laguna Hills, CA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 10/409,743

(22) Filed: Apr. 8, 2003

(65) Prior Publication Data

US 2004/0202431 A1 Oct. 14, 2004

(51) Int. Cl.[7] ................................................ H04N 5/91
(52) U.S. Cl. ........................... 385/76; 385/77; 385/78; 439/352
(58) Field of Search ......................... 385/77, 78, 76, 385/59, 55, 56; 174/74 R, 75 F, 79; 439/352, 354, 344

(56) References Cited

U.S. PATENT DOCUMENTS

| | | | | |
|---|---|---|---|---|
| 5,562,475 A | * | 10/1996 | Kern et al. ................. | 439/344 |
| 5,579,425 A | * | 11/1996 | Lampert et al. ............. | 385/59 |
| 5,651,689 A | * | 7/1997 | Plyler et al. ................ | 439/352 |
| 5,672,071 A | * | 9/1997 | Ceru .......................... | 439/353 |
| 5,685,731 A | * | 11/1997 | Lin ............................. | 439/344 |
| 5,711,684 A | * | 1/1998 | Inoue et al. ................ | 439/354 |
| 5,803,651 A | * | 9/1998 | Saito ......................... | 403/329 |
| 6,290,527 B1 | * | 9/2001 | Takaya et al. .............. | 439/352 |
| 6,319,043 B1 | * | 11/2001 | Takatsuki et al. .......... | 439/358 |
| 6,364,685 B1 | * | 4/2002 | Manning .................... | 439/357 |
| 6,435,896 B1 | * | 8/2002 | Takatsuki ................... | 439/354 |
| 6,506,070 B1 | * | 1/2003 | Huang ....................... | 439/352 |
| 6,533,601 B2 | * | 3/2003 | Raudenbush et al. ...... | 439/352 |

* cited by examiner

Primary Examiner—William H. Mayo, III
(74) Attorney, Agent, or Firm—Roger C. Turner

(57) ABSTRACT

A secondary latch (50) is provided for an electrical or optic fiber connector (12) that has a housing (22) with a housing body (24) and with a primary latch (26). The primary latch is of the type that has a front end (30) merging with the housing body and a rear end forming a handle (42) that can be depressed to release the latch and allow the connector to be withdrawn from a terminus coupling (16). The secondary latch prevents unintentional unlatching of the primary latch. The secondary latch includes a sleeve (60) that extends around the housing body and that can slide forward and rearward thereon, and a wedge part (52) that is wedged between a lower surface (56) of the handle and a top surface (54) of the housing body.

10 Claims, 3 Drawing Sheets

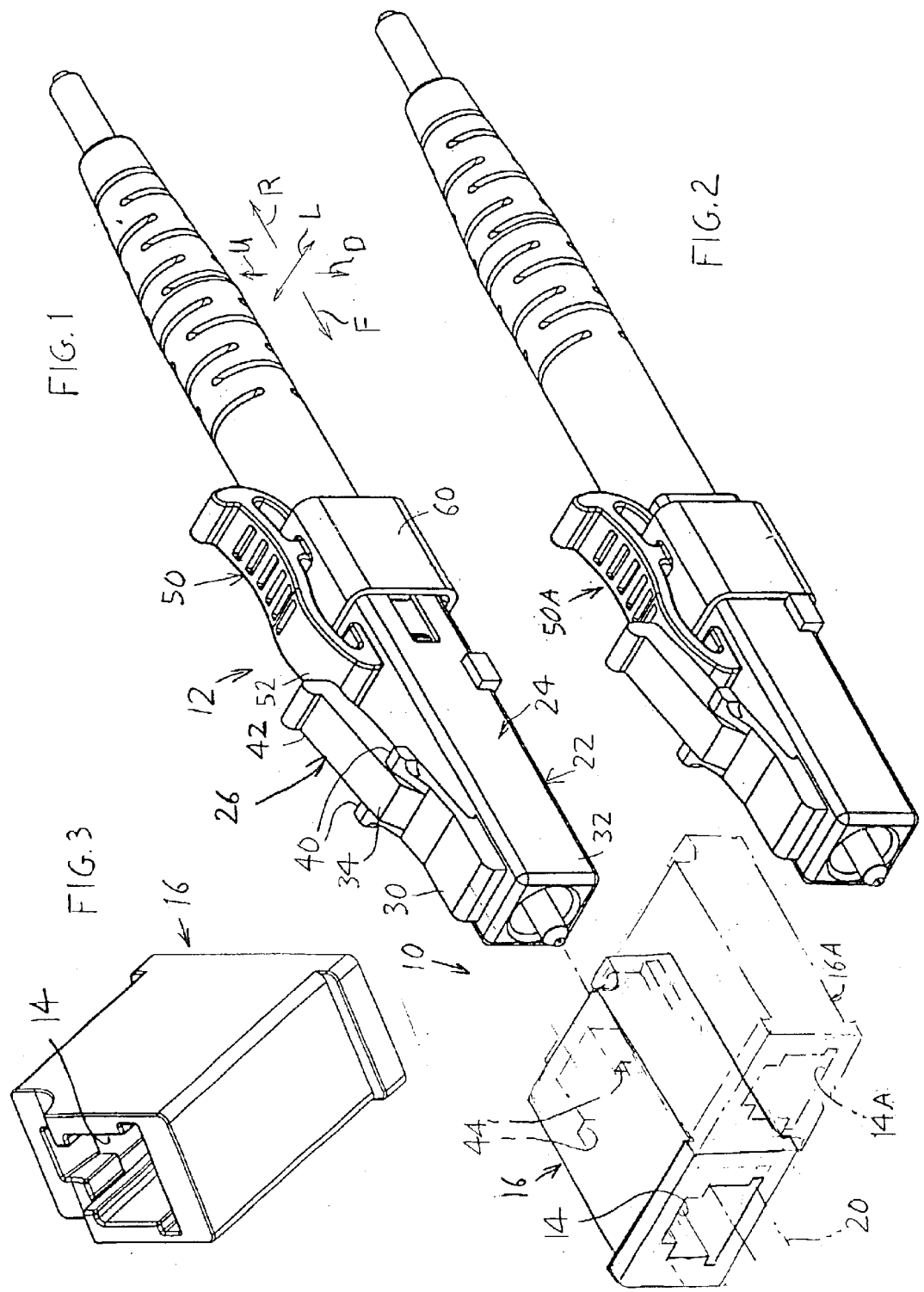

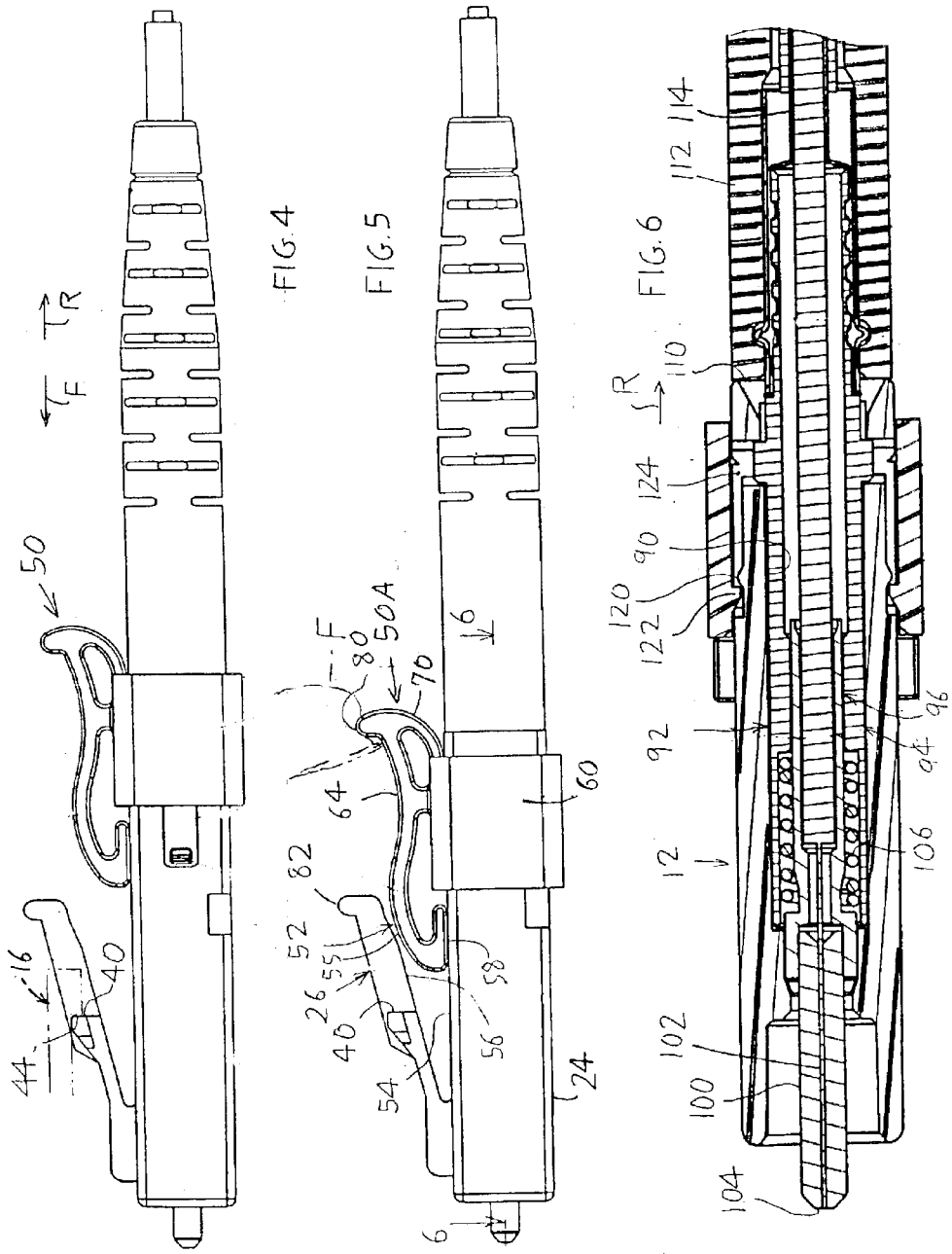

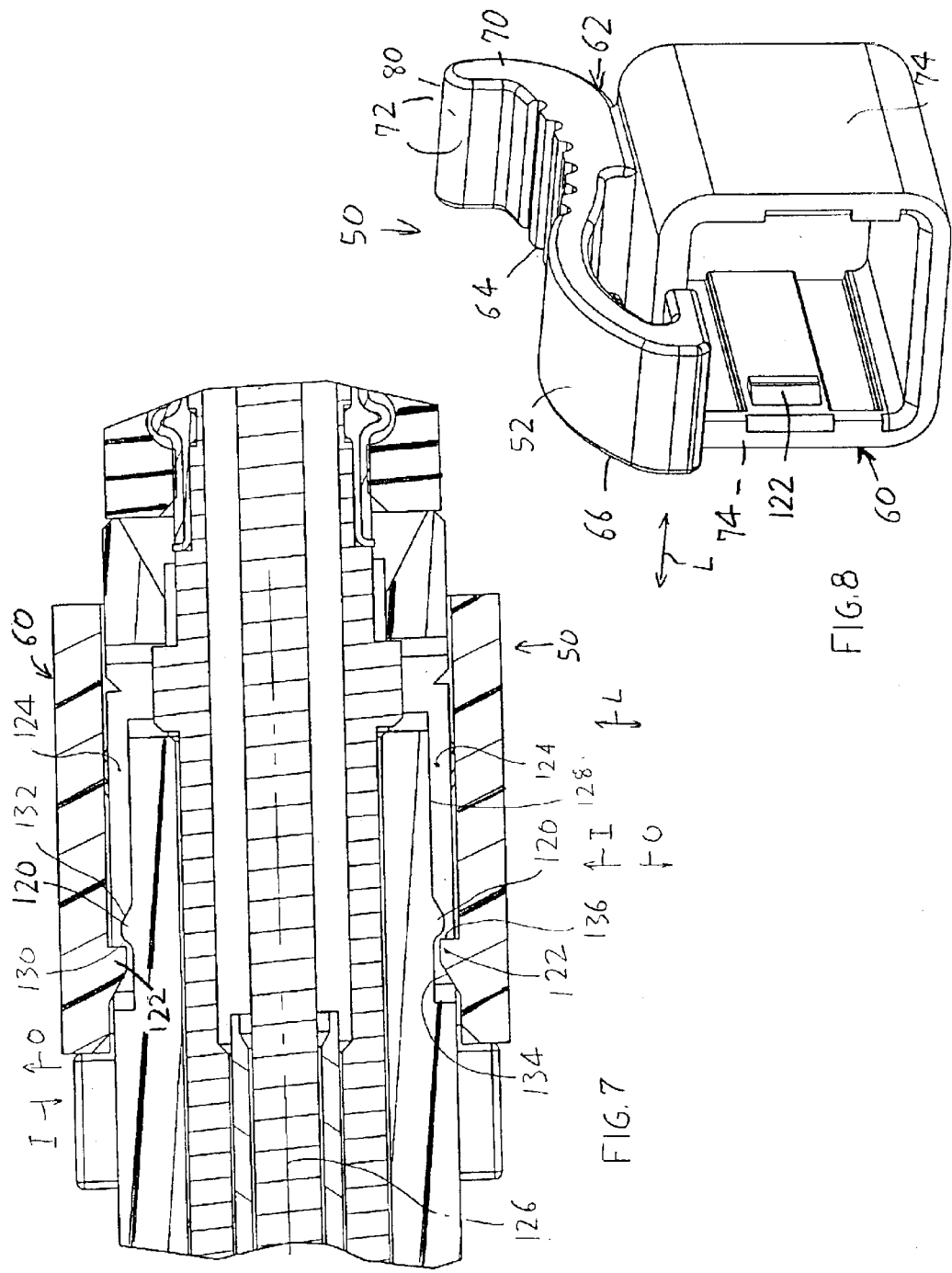

CONNECTOR SECONDARY LATCH

BACKGROUND OF THE INVENTION

One type of connector includes a housing with the familiar RJ-45 telephone style latch. This type of connector is used for both electrical connectors (wherein electrically conductive contacts engage one another) and optic fiber connectors (wherein modulated light is passed from one optic fiber to another one). The connector housing is formed of molded plastic with a housing body having a passage that holds a contact or optic fiber terminus. The housing also forms a latch with a front end that merges with the housing body, a middle that forms a pair of latch shoulders, and a rear that forms a handle. When the housing is inserted forwardly into a terminus coupling or the coupling formed by a mating electrical connector, that is designed for such a connector, the latch is automatically depressed until the latch shoulders move behind coupling shoulders, the latch then springing up so the latch shoulders lie directly forward of the coupling shoulders. The connector then cannot be removed unless the handle is depressed to depress the latch shoulders so they are not in line with the coupling shoulders.

While the above type of connector is in very wide use, its use has revealed a fundamental weakness that precludes it from being used in harsher environments where it might be subjected to elevated temperatures and vibration. In the case of an optic fiber connector, the optic fiber terminus lying in the connector housing, is spring biased rearwardly with a considerable force. Such bias assures that the tips of optic fibers will firmly abut one another to assure that light passes from optic fiber to the other. The same spring force tends to cause the connector to spontaneously disengage from the terminus coupling under an environment of elevated temperature and vibration. The failure results from stress relaxation. Electrical connectors also can spontaneously disengage in such an environment. A small added device that prevented such spontaneous disengagement of the connector, would enable such very popular small connectors to be used in many more applications.

Any device that prevented spontaneous disengagement of the above described popular connectors, should project minimally from the space occupied by present connectors. In some applications, a plurality of the above types of connectors are closely spaced apart and any added device should not interfere with insertion and removal of each connector individually.

SUMMARY OF THE INVENTION

In accordance with one embodiment of the present invention, a secondary latch is provided that mounts on the body of a small connector of a type that has a latch of the telephone type, and that prevents inadvertent release of the primary latch, wherein the secondary latch extends only a very small distance laterally beyond the profile of a connector without such secondary latch. The secondary latch has a sleeve that slides between forward and rearward positions around the housing body. The secondary latch also has a wedge part that substantially wedges between the latch handle and the top of the housing body. The wedge part prevents inadvertent downward movement of the primary latch.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of an optic fiber connector with a secondary latch of the present invention in its rearward deactivated state, and showing, in solid lines, a terminus coupling with a single passageway, and showing in phantom lines, the rest of a terminus coupling with two terminus-receiving passageways.

FIG. 2 is an isometric view of the connector of FIG. 1, but with the secondary latch in its forward activated position.

FIG. 3 is a bottom isometric view of the terminus coupling of FIG. 1.

FIG. 4 is a side elevation view of the connector of FIG. 1, with the secondary latch in its rearward, deactivated position.

FIG. 5 is a view similar to FIG. 4, but with the secondary latch in its forward, activated position.

FIG. 6 is a sectional view taken on line 6—6 of FIG. 5.

FIG. 7 is an enlarged view of a portion of the connector of FIG. 6.

FIG. 8 is a front isometric view of the secondary latch of FIGS. 1–2 and 4–5.

DESCRIPTION OF THE PREFERRED EMBODIMENTS

FIG. 1 illustrates an optic fiber connector system 10 which includes a small form optic fiber connector 12 that can fit into the passageway 14 of a terminus coupling 16 to couple the connector 12 to another similar connector or connector device 20. The connector 12 includes a housing 22 with a housing body 24 of largely uniform cross-section along its entire length in longitudinal forward F and rearward R directions. The housing also includes a primary latch 26 that is connected to the housing body 24. The primary latch 26 is of the familiar RJ-45 telephone style latch which was developed for use with electrical conductors and which is now widely used for optical fiber connectors. An example of an electrical connector of this type is shown in U.S. Pat. No. 6,115,256. The primary latch of the connector 10 has a front end 30 that merges with a front portion 32 of the housing body. The latch has a middle 34 forming a pair of largely rearwardly-facing latch shoulders 40, and has a rear end forming a latch handle 42.

When the connector is inserted forwardly F into the terminus coupling 16, the latch 26 is automatically depressed until the shoulders 40 move forward of forwardly-facing terminus coupling shoulders 44. The latch 26 then snaps upward until its shoulders 40 are in line with the coupling shoulders 44. The connector thereafter generally cannot be removed from the terminus coupling, unless the latch handle 42 is depressed to move the latch shoulders 40 below the terminus shoulders 44. Although the particular terminus coupling 16 is shown with a single passageway 14, other terminus couplings are available that have additional passages, such as coupling 16A which includes two passages 14, 14A.

When the connector 12 is used in a harsh environment, as where there is an elevated temperature (e.g. above 80° C. or 176° F.) and the connector is subjected to vibrations, the primary latch sometimes fails for an optic or electrical connector. Spring forces in an optic connector that tend to push the connector 12 rearwardly R, increase the possibility that an optic fiber connector will move rearward and disconnect optic fiber communications.

In accordance with the present invention, applicant provides a secondary latch 50 that prevents the primary latch 26 from unlatching from the terminus coupling 16. The secondary latch can be moved in forward and rearward directions between the rearward deactivated position shown in FIG. 1 and the forward activated position shown at 50A in FIG. 2. FIGS. 4 and 5 show the secondary latch in the deactivated position 50 and the activated position 50A. In FIG. 5, it can be seen that in the activated position, a wedge part 52 of the secondary latch lies under the primary latch 26. A top surface 55 of the wedge part lies against a lower surface 56 of the primary latch, and by a lower surface 58 of the wedge part lies against a top surface 54 of the housing body 24, to prevent the latch shoulders 40 from moving down.

FIG. 8 shows that the secondary latch 50 includes a secondary latch frame in the form of a sleeve 60 that extends around the housing body and a beam 62 mounted on the top of the sleeve. The wedge part 52 is mounted on, or coupled to, the sleeve 60 through the beam 62. The beam has a beam middle 64 lying over the sleeve, a beam front portion 66 that forms the wedge part 52, and a beam rear part 70 that forms push surfaces 72. When there is substantial room around the connector, after insertion or before removal, a person usually grasps laterally L opposite sides 74 of the sleeve between the person's thumb and index fingers and slides the secondary latch forward to activate it and rearward to deactivate it. However, there is often not enough room around the connector to grasp the opposite sides of the sleeve, especially if a second connector is inserted into an adjacent second passageway of the terminus coupling. In that case, the person pushes against the push surfaces 72 at the rear part of the beam. As shown in FIG. 5, the wedge part 52 has a convex upper surface, while the beam middle 64 is concave, leading to an upward projection 80 at the beam rear part 70. It is noted that the primary latch 26 also has an upward projection 82, but this is only to help a person feel what his finger is touching when he is depressing the handle. The projection 80 on the secondary latch is used so a person can place his finger at F to push the secondary latch forward and rearward (not downward) when he cannot grasp the opposite sides of the sleeve, in order to slide the latch.

FIG. 6 shows some details of the connector 12. The connector has a through passage 90. An optic fiber terminus cartridge 92 lies in the passage, and includes a sleeve-shaped hollow frame 94 and a terminus 96 mounted in the frame. The terminus includes a ferrule 100 that holds an optic fiber 102 and that has a tip 104 where the tips of the ferrule and optic fiber are flush. A spring 106 urges the terminus forwardly with a relatively large force such as 2.5 pounds for a terminus having a ferrule 100 of a diameter of 1.6 mm. It is noted that this relatively high force that tends to push the connector rearwardly R out of a terminus coupling, tends to cause connector withdrawal under elevated temperatures and vibrations, which the secondary latch prevents. Behind the rear end 110 of the housing, a flexible strain relief assembly 112 is provided which holds the optic fiber cable 114 that includes the fiber 102.

When the secondary latch is slid to its forward or rearward position, it is desirable that the secondary latch remain in its new position. This is accomplished by providing detents 120 on the housing body which interact with latch lugs 122 on either side of the sleeve. The detents 120 lie in recesses 124 at laterally opposite sides of the housing body, to avoid additional sideward projections that would unduly increase the total width of the connector. FIG. 7 shows that the detents 120 project outward O (away from the passageway axis 126) from inner walls 128 of the recesses. The latch lugs 122 project inwardly I from the rest of the sleeve 60. The detents have front and rear shoulders 130, 132, that are each inclined by at least 200 to the lateral direction L. Each latch lug 122 has front and rear shoulders 134, 136, with the front shoulder 134 being inclined from the lateral direction but the rear shoulder 136 preferably not being inclined. As a result, the secondary latch 50 can be readily moved forwardly to its activated position, but requires a somewhat higher force to move it rearwardly to its deactivated position.

In a connector of the construction illustrated that applicant has designed, the optic fiber connector had an original width of about 5.7 mm. With the secondary latch 50 in place, the width of the connector increased from about 5.7 mm to 7.5 mm, which is about a 30% increase. The overall height of the connector was increased by only about 1 mm, by the sleeve projecting about 1 mm below the lower surface of the housing body. The tall projection of the secondary latch beam 62 did not increase the height of the connector, since the upward projection of the beam even at the projection 80, was less than the upward projection of the primary latch 26 above the housing body.

While the connector is illustrated with its primary latch projecting upwardly from the housing body, it should be understood that the connector can be used in any orientation with respect to the Earth. Accordingly, terms such as "top", "bottom", etc. indicate only the relative orientation of the parts, rather than their orientation with respect to the Earth.

While the above description has been directed to an optic fiber connector, it should be understood that almost all of the description applies to an electrical connector, such as the type illustrated in U.S. Pat. No. 6,115,256, which has a primary latch and which is designed for insertion into a coupling formed by the housing of a mating electrical connector.

Thus, the invention provides a secondary latch and an optic fiber connector or electrical connector with such latch, wherein the secondary latch prevents unlatching of the connector from a terminus coupling or mating electrical connector housing coupling under adverse conditions such as elevated temperatures and vibrations. The secondary latch includes a wedge part that can be moved to a position between a lower surface of the primary latch and a top surface of the housing body to prevent the primary latch from moving downward until the wedge part has been removed from beneath the primary latch. The wedge part is formed on a beam that is attached to a sleeve that surrounds the housing body and can slide forward and rearward thereon. The wedge part lies forward of the top of the sleeve to lie directly between the primary latch and housing body top surface. Opposite sides of the housing body have recesses with detents therein that engage lugs on the sleeve to hold the secondary latch against movement, especially from moving unintentionally rearward from its forward activated position.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for use with a connector that includes a housing having a housing body that is elongated in front and rear longitudinal directions and that has a housing body top, said housing having a primary latch that is integrally molded with said housing body and that has a pair of largely rearwardly-facing latch shoulders and a handle that can be depressed to move down said latch shoulders, the handle having a lower handle surface that is spaced above said housing body top, wherein said apparatus prevents inadvertent downward movement of the primary latch handle, comprising:

a secondary latch that forms a sleeve constructed to extend closely around said housing body and to slide forward and rearward therealong, said sleeve having a top, and said secondary latch includes a wedge part coupled to said sleeve to slide forward and rearward with said sleeve;

said wedge part extends to a position forward of said sleeve top and has upper and lower wedge surfaces that simultaneously substantially contact said handle lower surface and said housing body top when said handle slides to a forward position.

2. The apparatus described in claim 1 wherein:

said secondary latch includes a beam with a middle fixed to said sleeve, a beam front forming said wedge part, and a beam rear forming an upward projection that is higher than the rest of the beam and that receives a person's fingertip to slide the secondary latch rearwardly.

3. The apparatus described in claim 2 wherein:

said beam has an upper surface with a convex front at said wedge part and with a concave middle extending between said convex front and said upward projection.

4. The apparatus described in claim 1 including said optic fiber connector, said sleeve encircling said housing body and wherein:

said housing body top is horizontal and said housing body has vertical opposite sides, each side having an inwardly-extending recess and an outwardly-projecting detent in each recess;

said sleeve has a pair of latch lugs each projecting into one of said recesses and lying in line with one of detents, said lugs and detents form shoulders that resist sleeve sliding of said sleeve in said forward and rearward directions.

5. Apparatus for use with an optic fiber connector that includes a housing having a housing body that is elongated in front and rear longitudinal directions and that has a housing body top, said housing body having a passageway that holds an optic fiber terminus, said housing also having a primary latch that is integrally molded with said housing body and that has at least one largely rearwardly-facing latch shoulder and a handle that can be depressed to move down said latch shoulder, the handle having a lower handle surface that is spaced above said housing body top, wherein said apparatus prevents inadvertent downward movement of the primary latch handle, comprising:

a secondary latch that has a sleeve constructed to extend at least partially around said housing body to lie at opposite sides of the body, and to slide forward and rearward therealong, said sleeve having a top, and said secondary latch includes an engaging part coupled to said sleeve to slide forward and rearward with said sleeve, said engaging part having an upper surface that contacts said handle lower surface when said handle slides to a forward position.

6. The connector described in claim 5 wherein:

said housing body has an upper housing surface and said engaging part has a lower surface that lies adjacent to said upper housing surface to press directly against said upper housing surface, to thereby use the housing to support the engaging part that prevents downward movement of the latch handle.

7. The apparatus described in claim 5 wherein:

said secondary latch includes a beam with a middle fixed to said sleeve, a beam front forming said engaging part, and a beam rear forming an upward projection that is higher than the rest of the beam and that receives a person's fingertip to slide the secondary latch rearwardly.

8. The apparatus described in claim 7 wherein:

said beam has an upper surface with a convex front at said engaging part (52) and with a concave middle extending between said convex front and said upward projection.

9. The connector described in claim 5 wherein:

said secondary latch has a largely forwardly-facing shoulder for engaging a person's finger tip to move the secondary latch rearwardly.

10. The apparatus described in claim 5 including said optic fiber connector, said sleeve encircling said housing body and wherein:

said housing body top is horizontal and said housing body has vertical opposite sides, each side having an inwardly-extending recess and an outwardly-projecting detent in each recess;

said sleeve has a pair of latch lugs each projecting into one of said recesses and lying in line with one of detents, said lugs and detents form shoulders that resist sleeve sliding of said sleeve in said forward and rearward directions.

\* \* \* \* \*